United States Patent
Narayanan

(10) Patent No.: US 8,433,864 B1
(45) Date of Patent: Apr. 30, 2013

(54) METHOD AND APPARATUS FOR PROVIDING POINT-IN-TIME BACKUP IMAGES

(75) Inventor: Priyesh Narayanan, Kerala (IN)

(73) Assignee: Symantec Corporation, Mountain View, CA (US)

( * ) Notice: Subject to any disclaimer, the term of this patent is extended or adjusted under 35 U.S.C. 154(b) by 831 days.

(21) Appl. No.: 12/164,317

(22) Filed: Jun. 30, 2008

(51) Int. Cl.
*G06F 12/16* (2006.01)

(52) U.S. Cl.
USPC .................. 711/162; 711/E12.103; 707/645; 707/646

(58) Field of Classification Search ........... 707/645–647
See application file for complete search history.

(56) References Cited

U.S. PATENT DOCUMENTS

| | | | |
|---|---|---|---|
| 6,434,681 B1* | 8/2002 | Armangau | 711/162 |
| 7,694,088 B1* | 4/2010 | Bromley et al. | 711/162 |
| 7,769,722 B1* | 8/2010 | Bergant et al. | 707/681 |
| 2003/0217119 A1* | 11/2003 | Raman et al. | 714/6 |
| 2004/0267836 A1* | 12/2004 | Armangau et al. | 707/203 |
| 2005/0015663 A1* | 1/2005 | Armangau et al. | 714/15 |
| 2005/0065986 A1* | 3/2005 | Bixby et al. | 707/204 |
| 2008/0208929 A1* | 8/2008 | Phillipi | 707/204 |

\* cited by examiner

*Primary Examiner* — Michael Krofcheck
(74) *Attorney, Agent, or Firm* — Campbell Stephenson LLP

(57) ABSTRACT

A method and apparatus for providing point-in-time consistent backup images while reducing a computing overhead associated with copy-on-write operations for snapshot images is described. In one embodiment, the method comprises processing at least one data block that is inconsistent with a backup image; and updating the backup image with the at least one inconsistent data block from a snapshot image, wherein the snapshot image is created after a backup process, wherein the updated backup image is point in time consistent.

20 Claims, 3 Drawing Sheets

METHOD AND APPARATUS FOR PROVIDING POINT-IN-TIME BACKUP IMAGES

BACKGROUND

1. Field of the Invention

Embodiments of the present invention generally relate to data protection systems and, more particularly, to a method and apparatus for providing point-in-time consistent backup images while reducing computing overhead.

2. Description of the Related Art

In a computing environment that hosts critical applications, data (e.g., financial data, user data, application data and the like) is backed up on a regular basis. As the amount of data to be backed up grows rapidly, there is a risk to overburden a computer while backing up such huge amount of data. As a result a backup window is considerably large. The backup window may be large due to large amount of data and/or frequent writes in the application that leads to higher number of copy-on-write (COW) operations. Generally, a copy-on-write operation requires one or more steps to be performed for each new write of a data block, which results in a significant amount of computing overhead, especially for large data systems. Consequently, a significant number of copy-on-write operations adversely affect the performance of the computing environment.

Current backup techniques perform a full backup process or an incremental backup process on a volume. As the backup process takes several hours during which one or more data blocks that are backed up may be changed. Consequently, the data blocks being backed up are not all point-in-time consistent since a particular data block may be changed during the backup process. For example, an applicant may write to a data block in the volume after an old version of the data block is backed up. As a result, the data block is not point-in-time consistent with the rest of the backed up data blocks. Consequently, the old version cannot be used to recovery data at any recovery point after the completion of the backup process.

In addition, snapshot based backup techniques takes a snapshot and then back up the data blocks. But, a first write of every block in the original volume suffer from the overhead associated with a copy-on-write operation. If the length of the backup window is large and/or there are frequent writes on the original volume then there may be a larger number of copy-on-write operations. Hence, larger number of copy-on-write operations results in overburdening the business server.

Accordingly, there is a need in the art for a method and apparatus for providing a backup image that is point-in-time consistent while reducing a computing overhead associated with copy-on-write operations for snapshot images.

SUMMARY OF THE INVENTION

Embodiments of the present invention comprise a method and apparatus providing point-in-time consistent backup images while reducing a computing overhead associated with copy-on-write operations for snapshot images. In one embodiment, a method for providing point-in-time consistent backups comprises processing at least one data block that is inconsistent with a backup image; and updating the backup image with the at least one inconsistent data block from a snapshot image, wherein the snapshot image is created after a backup process, wherein the updated backup image is point in time consistent.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
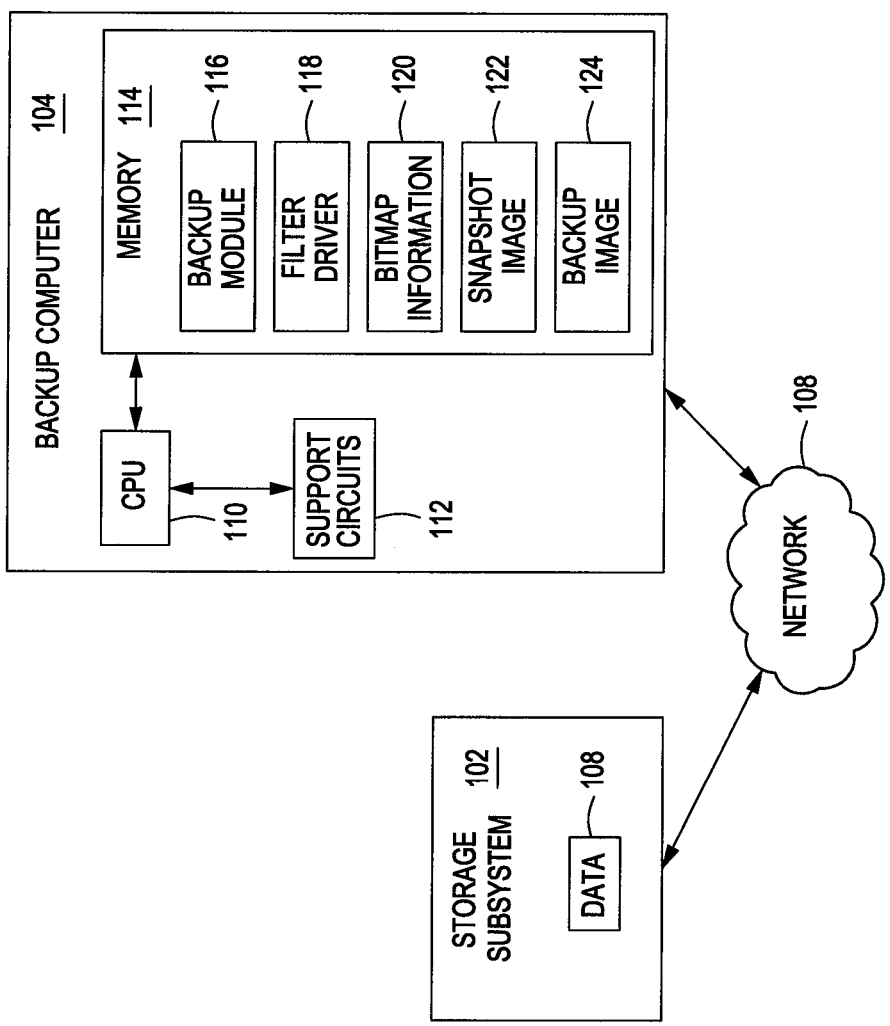
FIG. 1 is a block diagram of a system for providing point-in-time consistent, in accordance with one or more embodiments of the present invention.

FIG. 1 is a block diagram of a system 100 for reducing backup overheads according to one embodiment. The system 100 comprises a backup computer 104, and a storage subsystem 102, coupled to each other through a network 106.

Generally, the storage subsystem 102 includes one or more storage devices, storage controllers and storage manage software. In one embodiment, the storage subsystem 102 forms a portion of a Storage Area Network (SAN). The storage subsystem 102 includes data 108. According to one embodiment, the data 108 includes a volume that is used by one or more client computers. The volume further includes data blocks, such as application specific data, financial data, user data and/or the like.

The backup computer 104 is any type of computing device (e.g., laptop, desktop, Personal Digital Assistant (PDA)), such as those generally known in the art. The backup computer 104 includes a Central Processing Unit (CPU) 110, support circuits 112, and a memory 114. The CPU 110 may comprise one or more commercially available microprocessors or microcontrollers that facilitate data processing and storage. The support circuits 112 facilitate the operation of the CPU 110 and comprise at least one of clock circuits, power supplies, cache, input/output circuits, and the like. The memory 114 comprises at least one of Read Only Memory (ROM), Random Access Memory (RAM), disk drive storage, optical storage, removable storage, and the like. The memory 114 includes a backup module 116, a filter driver 118, and bitmap information 120. The memory 114 further includes a snapshot image 122 and a backup image 124.

The network 106 comprises a communication system that connects a computer system by wire, cable, fiber optic and/or wireless link facilitated by various types of well-known network elements, such as hubs, switches, routers, and the like. The network 106 may employ various well-known protocols to communicate information amongst the network resources. For example, the network 106 may be a part of the internet or intranet using various communications infrastructure such as Ethernet, WiFi, WiMax, General Packet Radio Service (GPRS), and the like.

According to various embodiments of the present invention, the backup module 116 performs a backup process on the data 108. In one embodiment, the backup module 116 stores the data 108 in the backup image 124. According to various embodiments of the present invention, the backup image 124 is a copy of data blocks that are backed up from the volume. In one embodiment, the backup image 124 includes one or more point-in-time inconsistent data blocks due to one or more changes to the data blocks during the backup process as described further below.

According to one embodiment, the snapshot image 122 of the volume is created after the backup image 124 is created (i.e., at a later point-in-time). In one embodiment, the snapshot image 122 includes references or pointers to addresses of the data blocks in the volume. In one embodiment, the snapshot image 122 is a point-in-time consistent copy of the volume at a particular moment in time (i.e., a recovery or backup point). In another embodiment, the snapshot image 122 is utilized to identify data blocks that are inconsistent (e.g., not point-in-time consistent with the backup image 124).

According to various embodiments of the present invention, the bitmap information 120 is a table with an address mapped to a bit that is set if a data block associated with the address changes during the backup process (i.e., the backup window). The bitmap information 120 tracks the data blocks that have changed during the backup process. In another embodiment, the bitmap information 120 is used to identify one or more inconsistent (e.g., not point-in-time consistent) data blocks in the backup image 124.

According to various embodiments of the present invention, the filter driver 118 generates the bitmap information 120 during the backup process. In one embodiment, the filter driver 118 updates the bitmap information 120 each time a particular data block is changed. In another embodiment, the filter driver 118 examines the bitmap information 120 to identify one or more point-in-time consistent data blocks in the snapshot image 122. In yet another embodiment, the backup module 116 copies the one or more point-in-time consistent data blocks to the backup image 124 to make the backup image 124 point-in-time consistent.

As an example and not as a limitation, block-level backup software, such as BACKUP EXEC SYSTEM RECOVERY may use one or more bitmaps to track data blocks that have changed in the volume during the backup process. In operation, the block-level backup software (e.g., the backup module) initiates a backup process to back up data blocks from the volume. The bitmap information 120 is maintained to track one or more data blocks that changed during the backup process. In one embodiment, if the backup module 116 performs a full backup process, then each and every data block is backed up while the bitmap information 120 is used to track the one or more data blocks that changed during the full backup process. If the backup module 116 backs up a data block to the backup image 124 before new data is written, the data block is not point-in-time consistent with the backup image 124. In another embodiment, if the backup module 116 performs an incremental backup process, then a current version of a change tracking bitmap is locked or "frozen" and then, stored in the bitmap information 120. In such an embodiment, the bitmap information 120 indicates one or more data blocks that changed since a previous incremental backup of the volume.

As one example, the backup module 116 performs a full backup process on the volume. The backup module 116 copies each and every data block of the volume to the backup image 124. The filter driver 118 generates the bitmap information 120 to indicate one or more data blocks that changed (e.g., were written to) during the full backup process. Subsequently, the snapshot image 122 is generated. The one or more data blocks indicated in the bitmap information are backed up from the snapshot image 122 to the backup image 124. Then, the snapshot image 122 is deleted. As a result, the data blocks in the backup image 124 are point-in-time consistent.

As another example, a first bitmap refers to a change tracking bitmap before an incremental backup process is performed on the volume. As such, the first bitmap is "frozen" and stored in the bitmap information 120 once an incremental backup process is initiated. A second bitmap represents the data blocks that have changed during the incremental backup process. The second bitmap is set when the data blocks in the volume is written for a first time since the first backup. When each and every data block as indicated in the first bitmap is backed up from the volume to the backup image 124 during the incremental backup process, the second bitmap is also "frozen" and then, stored in the bitmap information 120. The backup image 124, at this moment is not a point-in-time consistent backup image.

Subsequently, the snapshot image 122 is generated for the volume. The filter driver 118 performs a Logical-OR (i.e., bit-wise OR) operation on the first bitmap and the second bitmap in order to create a third bitmap, which indicates one or more data blocks that changed since a previous incremental backup. As data is written to the backup image 124, the snapshot image 122 maintains previous versions of one or more data blocks. As such, the third bitmap identifies one or more data blocks that may be inconsistent with the backup image 124 (e.g., not point-in-time consistent) if such data blocks were changed after the backup module 116 copied previous versions of such data blocks. In one embodiment, the incremental backup process copies data blocks as indicated by the third bitmap from the snapshot image 122 to the backup image 124. Therefore, the incremental process updates the backup image 124 with point-in-time consistent data blocks to replace the identified one or more data blocks. Accordingly, the backup image 124 is now a point-in-time consistent backup image.

As another example, N represents a number of data blocks that are to be backed up. The average rate at which backup software (e.g., BACKUP EXEC SYSTEM RECOVERY) reads and backs up the data blocks is referred to as M blocks per second. The average rate of first copy on writes to the data blocks in a volume is referred to as K blocks per second. The time required for a backup process using a conventional method is N/M seconds. The number of potential copy on writes in the N/M seconds is K*N/M. The number of potential copy on writes in an inventive method will be measured as follows. Performance of a backup process is divided into two portions. In a first portion of the backup process, no snapshot image (e.g., the snapshot image 122) is created. As a result there may be zero or very few copy-on-write operations in the first portion of the backup process.

In a second portion of the backup process, all the data blocks that have changed during the first portion of the backup process are to be backed up. The time required for the second portion of the backup process is (K*N)/(M*M) seconds. The number of potential copy-on-write operations in the second portion of the backup process is (K*K*N)/(M*M). As a result, an improvement factor in a potential number of copy-on-write operations to be performed is computed through ((K*K*N)/(M*M))/(KIN/M)), which is equivalent to K/M. The rate M at which data blocks are read and backed up by the backup software is significantly higher that the rate K at which the first writes to the data block in the volume occurs. As a result, the fraction K/M is much less that one. Hence, computing overhead from a significant number of copy-on-write operations is saved.

Figure 2:
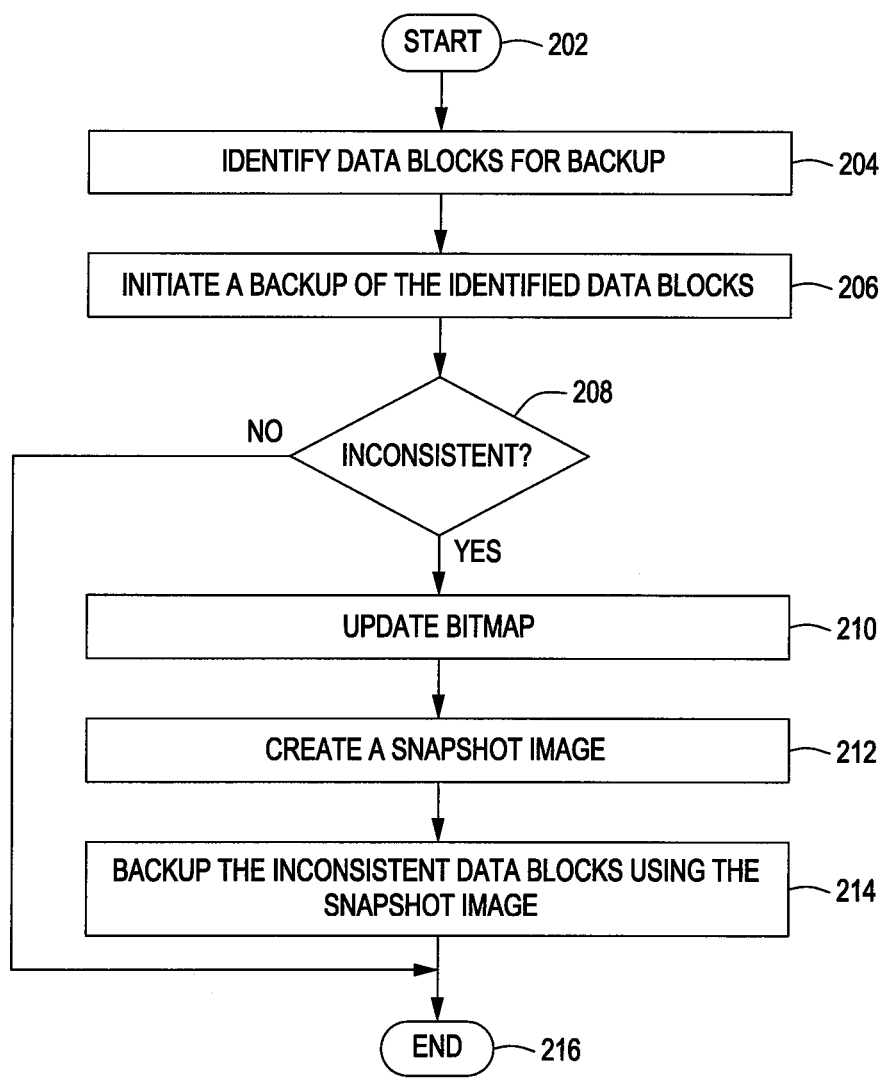
FIG. 2 is a flow diagram of a method for reducing backup overheads, in accordance with one or more embodiments of the present invention.

FIG. 2 is a flow diagram of a method 200 for reducing backup overheads according to one embodiment. The method 200 starts at step 202 and proceeds to step 204, at which data blocks from a volume are identified for backup. At step 206, a backup process of the identified data blocks is initiated by a backup module (e.g., the backup module 116 of FIG. 1) and a backup image (e.g., the backup image 124 of FIG. 1) is created.

At step 208, a determination is made as to whether the data blocks are inconsistent. If, it is determined that the data blocks are not inconsistent (option "NO"), then the method 200 proceeds to step 216 where the method 200 ends.

If at step 208, it is determined that the data blocks are inconsistent (option "YES") then the method 200 proceeds to step 210. At step 210, bitmap information (e.g., the bitmap information 120 of FIG. 1) is updated by a filter driver (e.g. the filter driver 118 of FIG. 1) to track the data blocks that have changed during the backup process. In one embodiment, the filter driver (e.g., the filter driver 118 of FIG. 1) analyzes the bitmap information (e.g., the bitmap information 120 of FIG. 1) to identify the one or more inconsistent data blocks.

At step 212, a snapshot image (e.g., the snapshot image 122 of FIG. 1) is created. The bitmap information (e.g., the bitmap information 120 of FIG. 1) is utilized to identify the inconsistent data block from the snapshot image (e.g., the snapshot image 122 of FIG. 1). The identified inconsistent data blocks are not point in time consistent with the backup image (e.g., the backup image 124 of FIG. 1). In one embodiment, the bitmap information (e.g., the bitmap information 120 of FIG. 1) is utilized to retrieve the inconsistent data blocks from the snapshot image (e.g., the snapshot image 122 of FIG. 1).

At step 214, the snapshot image (e.g., the snapshot image 122 of FIG. 1) is utilized to backup the inconsistent data blocks to update the backup image (e.g. the backup image 124 of FIG. 1). The updated backup image is point in time consistent. At step 216, the method 200 ends.

Figure 3:
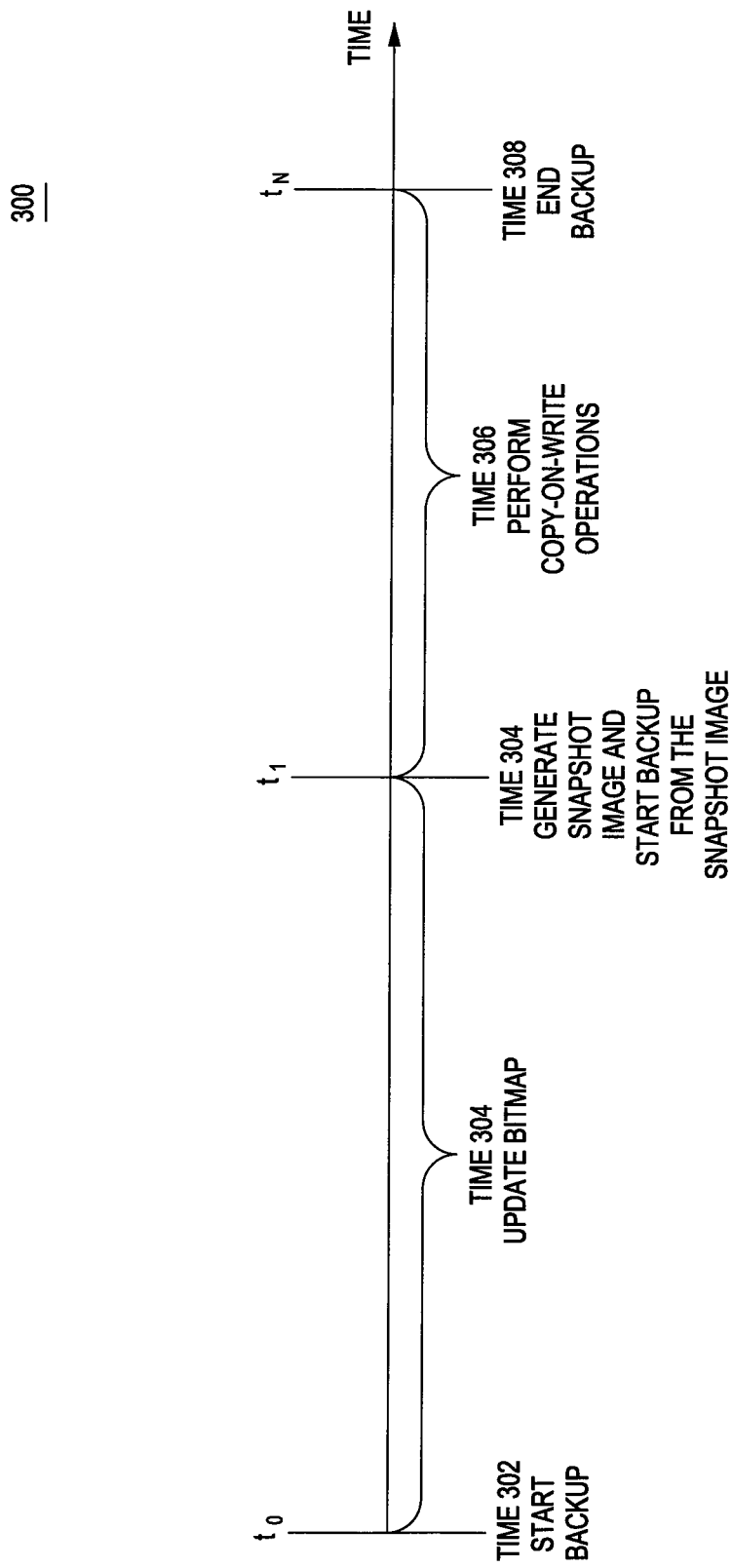
FIG. 3 is a time chart of a time line to perform backup, in accordance with one or more embodiments of the present invention.

FIG. 3 is a chart that illustrates a time line 300 to perform a backup process to provide a point-in-time consistent backup image according to one embodiment of the present invention. The time line 300 starts at time 302 ($t_o$), at which a backup process for a volume is started and a backup image (e.g., the backup image 124 of FIG. 1) is created. If the backup process is an incremental backup, a current change tracking bitmap is "frozen" before the incremental backup process is initiated. Then, one or more data blocks as indicated by the current change tracking bitmap is copied to the backup image. If the backup process is a full backup, each and every data block is copied to the backup image.

At time 304, a bitmap (e.g., the bitmap information 120 of FIG. 1) is created to indicate one or more data blocks that changed during the backup process. The bitmap is updated when a data block is written on the volume. As explained above, the backup image, at this moment is not a point-in-time consistent backup image.

At time 306 ($t_1$), a snapshot image (e.g., the snapshot image 122 of FIG. 1) is created. The bitmap is used to identify data blocks that are not point-in-time consistent. If the backup process is an incremental backup, a Logical-OR (i.e., bit-wise OR) operation is performed on the current change tracking bitmap and the bitmap to create a bitmap that indicates one or more inconsistent data blocks. A subsequent backup process is started to update the backup image (e.g., the backup image 124 of FIG. 1) with the identified data blocks that are not point-in-time consistent from the bitmap.

At time 308, copy-on-write operations are performed such that the backup image (e.g., the backup image 124 of FIG. 1) is now point in time consistent. At time 310, the backup process ends. Accordingly, a small number of copy-on-write operations were required to provide a point-in-time consistent backup image from a volume. Specifically, no copy-on-write operations were performed between time 302 and time 304.

Thus, various embodiments of the present invention offer various advantages. The inventive methods and apparatus may provide reduced overheads for a backup process. The various embodiments minimize copy-on-write operations and may be utilized to operate with any snapshot software provider. Further, the various embodiments can be applied to full and incremental backups.

While the foregoing is directed to embodiments of the present invention, other and further embodiments of the invention may be devised without departing from the basic scope thereof, and the scope thereof is determined by the claims that follow.

The invention claimed is:

1. A method comprising:
   initiating a backup process, wherein
      the backup process creates a backup image, and
      the backup image represents a copy of all data blocks in a volume;
   during the backup process, determining that at least one data block of the volume is inconsistent with the backup image;
   processing the at least one data block, wherein
      the processing comprises
         creating bitmap information,
      the bitmap information indicates at least one changed block, and
      the at least one changed block comprises the at least one data block;
   generating a snapshot image, wherein
      the snapshot image is generated while the backup process is ongoing, and
      the snapshot image comprises
         a point-in-time consistent copy of the at least one data block; and
   producing an updated backup image, wherein
      the producing comprises
         updating the backup image with the point-in-time consistent copy of the at least one data block, and
      the updated backup image is point-in-time consistent.

2. The method of claim 1, wherein the processing the at least one data block further comprises:
   storing backup data in the backup image during the backup process, wherein
      the at least one data block is not included within the backup image.

3. The method of claim 1, wherein
   the bitmap information is generated during the backup process.

4. The method of claim 3, wherein the producing the updated backup image further comprises:
   identifying the at least one data block by analyzing the bitmap information.

5. The method of claim 4, wherein the producing the updated backup image further comprises:
   retrieving the at least one data block from the snapshot image using the bitmap information.

6. The method of claim 1, wherein the backup process is one of
   a full backup process, and
   an incremental backup process.

7. The method of claim 1, wherein the processing the at least one data block further comprises:
creating a first bitmap, wherein
the first bitmap identifies one or more previously changed data blocks of the volume;
creating a second bitmap, wherein
the second bitmap identifies one or more changed data blocks,
the one or more changed data blocks are identified during an incremental backup process, and
the incremental backup process is performed on the volume; and
producing a third bitmap from the first bitmap and the second bitmap, wherein
the third bitmap identifies the at least one data block.

8. The method of claim 7, wherein the processing the at least one data block further comprises:
producing the third bitmap by performing a logical OR operation between the first bitmap and the second bitmap.

9. The method of claim 1, wherein the processing the at least one data block further comprises:
creating a bitmap, wherein
the bitmap identifies one or more changed data blocks during the backup process,
the backup process is a full backup process, and
the one or more changed data blocks comprise the at least one data block.

10. The method of claim 1, wherein the processing the at least one data block further comprises:
generating the backup image by performing a first portion of the backup process on the volume; and
generating a second backup image by performing a second portion of the backup process on the snapshot image.

11. The method of claim 10, wherein the producing the updated backup image further comprises:
synthesizing a third backup image from the backup image and the second backup image, wherein
the third backup image is point-in-time consistent.

12. An apparatus configured to provide point-in-time consistent backup, comprising:
a backup module, wherein
the backup module is configured to initiate a backup process,
the backup process creates a backup image,
the backup image represents a copy of all data blocks in a volume,
at least one data block of the volume is inconsistent with the backup image,
a snapshot image, generated while the backup process is ongoing, comprises
a point-in-time consistent copy of the at least one data block,
the backup module is further configured to produce an updated backup image with the point-in-time consistent copy of the at least one data block, and
the updated backup image is point-in-time consistent; and
a filter driver, wherein
the filter driver is configured to create bitmap information,
the bitmap information indicates at least one changed data block,
the at least one changed data block comprises the at least one data block,
the filter driver is further configured to produce updated bitmap information by virtue of being configured to update the bitmap information, and
the filter driver is further configured to determine that the at least one data block of the volume is inconsistent with the backup image, during the backup process.

13. The apparatus of claim 12, wherein the backup module is further configured to:
store backup data in the backup image during the backup process, wherein
the at least one data block is not included within the backup image.

14. The apparatus of claim 12, wherein the backup module is further configured to:
generate the backup image by virtue of being configured to perform a first portion of the backup process on the volume, and
generate a second backup image by virtue of being configured to perform a second portion of the backup process on the snapshot image.

15. The apparatus of claim 14, wherein the backup module is further configured to:
synthesize a third backup image from the backup image and the second backup image, wherein
the third backup image is point-in-time consistent.

16. The apparatus of claim 12, wherein the filter driver is further configured to:
create a first bitmap, wherein
the first bitmap is configured to indicate one or more previously changed data blocks of the volume,
create a second bitmap, wherein
the second bitmap is configured to indicate one or more changed data blocks,
the one or more changed data blocks are identified during an incremental backup process, and
the incremental backup process is performed on the volume, and
produce a third bitmap from the first bitmap and the second bitmap, wherein
the third bitmap indicates the at least one data block.

17. The apparatus of claim 16, wherein the filter driver is further configured to:
produce the third bitmap by virtue of being configured to perform a logical OR operation between the first bitmap and the second bitmap.

18. A system configured to provide a point-in-time consistent backup, comprising:
a storage subsystem comprising data; and
a backup computer comprising
a backup module, wherein
the backup module is configured to initiate a backup process,
the backup process creates a backup image,
the backup image represents a copy of all data blocks in a volume,
at least one data block of the volume is inconsistent with the backup image,
a snapshot image, generated while the backup process is ongoing, comprises a point-in-time consistent copy of the at least one data block,
the backup module is further configured to produce an updated backup image with the point-in-time consistent copy of the at least one data block, and
the updated backup image is point-in-time consistent; and
a filter driver, wherein the filter driver is configured to create bitmap information, the bitmap information indicates at least one changed data block, the at least one changed data block comprises the at least one data block, the filter driver is further configured to produce updated bitmap information by virtue of being configured to update the bitmap information, and the filter driver is further configured to determine that the at least one data block of the volume is inconsistent with the backup image, during the backup process.

19. The system of claim 18, wherein the backup module is further configured to:

generate the backup image by virtue of being configured to perform a first portion of the backup process on the volume, and generate a second backup image by virtue of being configured to perform a second portion of the backup process on the snapshot image.

20. The system of claim 19, wherein the backup module is further configured to:

synthesize a third backup image from the backup image and the second backup image, wherein the third backup image is point-in-time consistent.

* * * * *